(12) United States Patent
Takahashi et al.

(10) Patent No.: US 6,645,318 B2
(45) Date of Patent: Nov. 11, 2003

(54) FUEL TANK MADE OF FERRITIC STAINLESS STEEL

(75) Inventors: Akihiko Takahashi, Kitakyushu (JP); Shunji Sakamoto, Kitakyushu (JP); Yuji Koyama, Kitakyushu (JP); Katsuhiko Kato, Kitakyushu (JP); Tadashi Komori, Hikari (JP); Naoto Ono, Hikari (JP); Masayuki Abe, Kitakyushu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/922,668

(22) Filed: Aug. 6, 2001

(65) Prior Publication Data

US 2002/0012602 A1 Jan. 31, 2002

(30) Foreign Application Priority Data

| Aug. 7, 2000 | (JP) | 2000-238663 |
| Oct. 17, 2000 | (JP) | 2000-317124 |
| Nov. 2, 2000 | (JP) | 2000-335516 |
| Jan. 22, 2001 | (JP) | 2001-013254 |
| Apr. 6, 2001 | (JP) | 2001-108339 |
| Jul. 31, 2001 | (JP) | 2001-231870 |

(51) Int. Cl.$^7$ .......... C22C 38/18; C22C 38/26; C22C 38/28

(52) U.S. Cl. .......... 148/325; 420/34
(58) Field of Search .......... 148/325; 420/34

(56) References Cited

U.S. PATENT DOCUMENTS

| 5,003,804 A | * | 4/1991 | Kenmochi et al. ............ 72/39 |
| 5,677,268 A | * | 10/1997 | Omosako et al. ............ 508/171 |
| 6,113,710 A | * | 9/2000 | Kato et al. .................. 148/325 |

FOREIGN PATENT DOCUMENTS

| JP | 6-158221 | 6/1994 |
| JP | 6-293978 | 10/1994 |
| JP | 9-156027 | 6/1997 |

* cited by examiner

Primary Examiner—Deborah Yee
(74) Attorney, Agent, or Firm—Kenyon & Kenyon

(57) ABSTRACT

The present invention provides: a fuel tank made of a ferritic stainless steel sheet having long lasting corrosion resistance under the environment of the fuel tank and excellent in formability when fabricating the fuel tank; more specifically, a fuel tank made of a ferritic stainless steel sheet containing 10 to 25 mass % of Cr and having an average r-value of 1.9 or larger, an r-value in-plane anisotropy Δr of 1.0 or smaller, and a total elongation of 30% or larger, having a plane intensity ratio I(111)/I(100) of 10 or larger, and having lubricant films on the surfaces of the steel sheet and a surface friction coefficient of 0.10 or less.

18 Claims, 1 Drawing Sheet

FUEL TANK MADE OF FERRITIC STAINLESS STEEL

TECHNICAL FIELD

The present invention relates to a fuel tank, for an automobile, demonstrating excellent corrosion resistance to internal gasoline degradation and external salt damage and made of a ferritic stainless steel sheet excellent in formability.

BACKGROUND ART

A steel material for a fuel tank, to contain automobile gasoline, requires corrosion resistance to the environment of the fuel tank and workability to allow pressing into a fuel tank. The internal environment of a fuel tank becomes a severe corrosive environment for a steel material when organic acid such as formic acid, acetic acid, etc., generated by the degradation of gasoline, dissolves in an aqueous phase contained in gasoline. On the other hand, the corrosion on the outer surface of a fuel tank is mainly caused by salt damage resulting from snowmelt salt, sea salt, etc. As a steel material suitable for these internal and external corrosive environments, a terne sheet produced by the surface treatment of Pb—Sn alloy has been used. Since a fuel tank is produced by press forming and has a partially complicated shape, the steel material also requires press formability. A terne sheet secures workability by using a highly formable steel sheet of deep drawing quality (DDQ) called IF (Interstitial Free) steel as its substrate. In addition, since the Pb—Sn alloy plated layers of a terne sheet have good workability and excellent lubricity, a terne sheet is usable as a material for a fuel tank also in terms of workability and has been widely used, accordingly.

However, since a terne sheet contains Pb, there is a movement to reconsider its use for a fuel tank from the recent need to suppress the elution of substances with environmental impact. For that reason, some terne sheets are being replaced with plated steel materials not containing Pb (for example, Al plated steel materials (Japanese Unexamined Patent Publication No. H9-156027)) or resins. Further, recently, as a part of the global environment improvement, the idea of extending the assurance period of a fuel tank from the current 10 years to 15 years and of regulating fuel penetration loss from a fuel tank to zero have surfaced internationally. With regard to these new requirements, it is thought that a conventional terne sheet or an Al plated steel sheet which is a substitute therefor cannot assure a 15 year life and resins cannot suppress the fuel penetration to zero.

Most recently, as a material to satisfy both requirements, the application of stainless steel to a fuel tank has been studied. With regard to steel grades, SUS304L, which is excellent in workability, and austenitic stainless steel, which has more improved corrosion resistance than SUS304L, are the candidates, taking long-term corrosion resistance and formability into consideration. However, the largest problem in using an austenitic stainless steel is that its reliability against stress corrosion cracking, generated by salt damage, cannot be secured. In an environment where stress corrosion cracking occurs, it is effective to adopt ferritic stainless steel which has the same level of corrosion resistance as that of austenitic stainless steel, instead of austenitic stainless steel. However, ferritic stainless steel has lower punch stretchability than that of austenitic stainless steel and therefore generally has low press working limit.

As a steel material excellent in press formability while maintaining the corrosion resistance of stainless steel, a clad steel sheet, for a fuel tank, the surface layers of which are composed of stainless steel and the inner layer of which is composed of carbon steel (IF steel) has been proposed in Japanese Unexamined Patent Publication Nos. H6-158221 and H6-293978. Though austenitic stainless steel is also proposed for the clad steel sheet described here, stress corrosion cracking can hardly be avoided as described above. It is stated that, in case of using ferritic stainless steel for a clad steel sheet, the clad steel sheet can provide as good a press formability as low carbon steel if soft steel excellent in workability is used as the inner layer. However, even in a clad steel sheet, it is necessary to improve the formability of ferritic stainless steel itself of the surface layers for securing excellent formability. To do so, it is conceivable, for example, to apply high temperature annealing to a clad steel sheet and soften the ferritic stainless steel of the surface layers. In this case, the annealing temperature is too high for the carbon steel of the inner layer and deterioration of the strength of the carbon steel, namely the clad steel sheet, becomes unavoidable. Further, in case of cutting a clad steel sheet and using it for forming parts, the carbon steel at the edges is exposed to a corrosive environment and therefore cumbersome anticorrosive measures have to be taken. For the aforementioned reasons, a fuel tank made of a clad steel sheet is not practically usable.

Therefore, for applying a ferritic stainless steel capable of avoiding a stress corrosion cracking problem to a fuel tank, it is necessary to develop ferritic stainless steel having a workability required to easily form a fuel tank as well as excellent corrosion resistance in a fuel tank environment.

The object of the present invention is to provide a fuel tank made of a ferritic stainless steel sheet which overcomes the problems of conventional materials, is excellent in long-term corrosion resistance, is usable for a fuel tank without fuel penetration, has no stress corrosion cracking, is excellent in corrosion resistance in the internal and external environments of the fuel tank, and is excellent in workability.

SUMMARY OF THE INVENTION

The present inventors investigated the workability required for press forming by carrying out press forming, into various shapes, of fuel tanks and then studied chemical compositions satisfying the required workability, with regard to a ferritic stainless steel having excellent corrosion resistance in the internal and external environments of a fuel tank.

As a result, the present inventors discovered that the workability of ferritic stainless steel sheet required for the press forming to form various shapes of fuel tanks were the average r-value of the steel sheet being 1.9 or larger, the r-value in-plane anisotropy $\Delta r$ thereof being 1.0 or smaller, and the total elongation thereof being 30% or larger. In addition to these properties, the present inventors confirmed that excellent workability in forming a fuel tank could be secured by controlling the texture and surface friction coefficient of a steel sheet to appropriate conditions. Further, the present inventors discovered that, for satisfying the above workability, it was effective to add Ti or Nb after C and N were lowered as the basic components. Furthermore, the present inventors discovered that, to not cause perforation for a long time in a salt damage environment and, further, to suppress rusting in a fuel environment, it was effective to add 10 to 25 mass % of Cr, add Ti or Nb after C and N were lowered as the basic components, and additionally add appropriate amounts of Mo, Cu and Ni. The present inventors have completed the present invention based on the above findings.

The gist of the present invention is as follows:

(1) A fuel tank characterized by being made of a ferritic stainless steel sheet containing 10 to 25 mass % of Cr and having an average r-value of 1.9 or larger, an r-value in-plane anisotropy Δr of 1.0 or smaller, and a total elongation of 30% or larger.

(2) A fuel tank according to the item (1), characterized by being made of a ferritic stainless steel sheet having a plane intensity ratio I(111)/I(100) of 10 or larger.

(3) A fuel tank according to the item (1), characterized by being made of a ferritic stainless steel sheet having lubricant films on the surfaces of the steel sheet and a surface friction coefficient of 0.10 or less.

(4) A fuel tank characterized by being made of a ferritic stainless steel sheet: comprising, in mass, 10 to 25% of Cr, 0.015% or less of C, 0.015% or less of N, and one or more of Ti and Nb in a manner to satisfy the expression (Ti+Nb)/(C+N)≧8, with the balance consisting of Fe and unavoidable impurities; and having an average r-value of 1.9 or larger, an r-value in-plane anisotropy Δr of 1.0 or smaller, and a total elongation of 30% or larger.

(5) A fuel tank according to the item (4), characterized by being made of a ferritic stainless steel sheet having a plane intensity ratio I(111)/I(100) of 10 or larger.

(6) A fuel tank according to the item (4), characterized by being made of a ferritic stainless steel sheet having lubricant films on the surfaces of the steel sheet and a surface friction coefficient of 0.10 or less.

(7) A fuel tank according to any one of the items (4) to (6), characterized by being made of a ferritic stainless steel sheet containing 0.005 mass % or less of C.

(8) A fuel tank according to any one of the items (4) to (7), characterized by being made of a ferritic stainless steel sheet containing 0.14 mass % or less of Si.

(9) A fuel tank according to any one of the items (4) to (8), characterized by being made of a ferritic stainless steel sheet containing 0.20 mass % or less of Mn.

(10) A fuel tank according to any one of the items (4) to (9), characterized by being made of a ferritic stainless steel sheet containing, in mass %, S and C in a manner to satisfy the expression S≧C.

(11) A fuel tank according to any one of the items (4) to (10), characterized by being made of a ferritic stainless steel sheet further containing one or more of Mo, Cu, Ni, B and Mg, in mass, in the range of 0.5 to 2.0% for Mo, 0.3 to 1.5% for Cu, 0.3 to 1.5% for Ni, 0.0003 to 0.005% for B, and 0.0005 to 0.005% for Mg.

THE MOST PREFERRED EMBODIMENT

Figure 1:
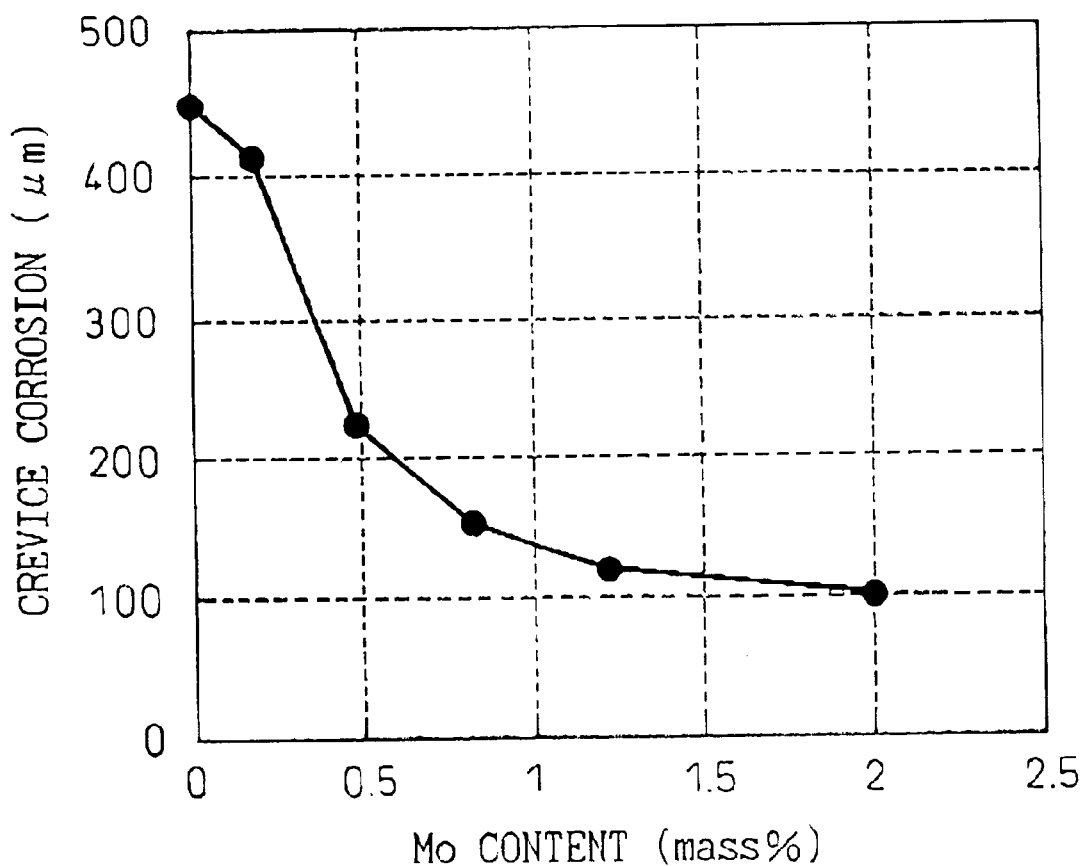
FIG. 1 is a graph showing the influence of Mo contained in a ferritic stainless steel sheet on the depth of crevice corrosion which is generated at spot welding portions in a combined cycle corrosion test simulating a salt damage environment at the exterior of a fuel tank.

The present invention is explained in detail hereunder.

Firstly, the reasons of limiting the ranges of workability and material properties required of a steel sheet for a fuel tank according to the present invention are explained.

It is desirable for a fuel tank for an automobile to be excellent in both punch stretchability and deep drawability at press forming, because the tank has a complicated shape. However, since the punch stretchability of ferritic stainless steel is lower than that of austenitic stainless steel, it is conceived that, for securing a press forming height, it is necessary to increase r-value and material inflow from a flange.

Then, the present inventors evaluated the influence of the average r-value of a steel sheet on formability by varying the r-values of steel sheets in the same steel grade and carrying out a press forming test to form fuel tanks in three kinds of shapes, which are currently used in terne sheets. The steel grade used for the test was steel A in the examples described later and its basic chemical composition was 17Cr-1.2Mo-0.2Ti. The formed fuel tanks were box shaped fuel tanks X (forming height of about 100 mm), box shaped fuel tanks Y (forming height of about 260 mm) and saddle shaped fuel tanks Z (forming height of about 150 mm), and the severity of working conditions increased in the order of the fuel tanks X, the fuel tanks Y and the fuel tanks Z. The following three kinds of steel sheets were obtained by varying the average r-values through changing heat treatment conditions and cold rolling conditions:

A-1: average r-value of 2.3, Δr of 0.7, elongation of 35%,

A-2: average r-value of 1.9, Δr of 0.7, elongation of 34%,

A-3: average r-value of 1.5, Δr of 0.6, elongation of 33%.

The obtained steel sheets were coated with film forming lubricant prepared by mixing wax in urethane resin and the surface friction coefficient was adjusted to 0.05. As a result of forming fuel tanks using steel sheets coated with lubricant films, in the cases of A-1 (present invention 1) and A-2 (present invention 2), press forming was completed with no problem but, in case of A-3 (comparative example 1), cracking occurred.

Even though a steel sheet having the average r-value of as high as 2.3 was produced using the same steel A, when Δr of the steel sheet was 1.5, the anisotropy was large, the material inflow from the flange was uneven and cracking occurred during the press of a fuel tank (comparative example 2). Further, even though a steel sheet had the average r-value of 1.9 and Δr of 0.7, when the elongation of the steel sheet was less than 30%, the ductility was insufficient and cracking occurred during the press of a fuel tank (comparative example 3).

From the above results, when a steel sheet is formed into the shape of a fuel tank with press forming, required are the formability that the average r-value of the steel sheet is 1.9 or larger, the r-value in-plane anisotropy Δr thereof is 1.0 or smaller, and the total elongation thereof is 30% or larger. The average r-value, Δr and total elongation of a steel sheet can be adjusted within the specified ranges by the appropriate control of production conditions such as lowering the temperature of hot rolled sheet annealing, eliminating hot rolled sheet annealing, heightening the temperature of finish annealing, raising the reduction of cold rolling and the like. Note that the average r-value and Δr of a ferritic stainless steel sheet used for a fuel tank according to the present invention are the values calculated from the following expressions, respectively:

average r-value=$(r_L+r_C+2r_D)/4$, $\Delta r=(r_L+r_C-2r_D)/2$.

Here, $r_L$, $r_C$ and $r_D$ are the Lankford values in the rolling direction of a steel sheet, in the direction perpendicular to the rolling direction thereof and in the direction of 45° from the rolling direction thereof, respectively.

Next, from the viewpoint of controlling a micro structure, since a high r-value of 1.9 or larger can be obtained by controlling the plane intensity ratio I(111)/I(100) to 10 or larger in the plane orientation of a steel sheet, it is preferable to adjust I(111)/I(100) in the texture of a steel sheet to 10 or larger. More preferably, much better deep drawability can be obtained by adjusting I(111)/I(100) to 15 or larger.

Plane intensity ratio I(111)/I(100) represents a ratio of X-ray plane intensity ratio I(111) to X-ray plane intensity ratio I(100), and the X-ray plane intensity ratio I(111) and I(100) are defined as a ratio of intensity of plane (111) and plane (100), in the plane orientation, measured by X-ray diffraction measurement at the thickness center of the steel sheet, to that of a random specimen respectively.

From the viewpoint of lubrication property, for enabling the complicated press forming of a fuel tank using ferritic stainless steel having lower punch stretchability than that of austenitic stainless steel, in addition to raising the average r-value of the steel sheet, it is effective to lower the friction coefficient of the steel sheet by applying lubricant films on the surfaces of the steel sheet in order to improve the material inflow from the flange. For forming a box shaped fuel tank as stated above, it is necessary to lower the friction coefficient of a steel sheet to at least 0.10 or smaller. Further, for facilitating the press forming of a fuel tank of a severe shape such as a saddle shaped fuel tank, it is preferable to make the friction coefficient of a steel sheet 0.05 or smaller.

Next, the limited range of the components of a ferritic stainless steel sheet used for a fuel tank according to the present invention is described hereunder. The contents of the components are in terms of mass %.

Cr is added to 10% or more to secure corrosion resistance in degraded gasoline. Formic acid and acetic acid which accelerate corrosion are contained in degraded gasoline. Furthermore, since gasoline contains alcohol in some regions, it is necessary to add at least 10% or more of Cr to secure corrosion resistance in these environments. In addition, Cr, together with Mo as stated below, is indispensable also for securing resistance to corrosion caused by salt damage on the outer surface of a fuel tank. However, its excessive addition lowers workability and increases cost and therefore the upper limit is set at 25%.

C can enhance both corrosion resistance and press formability when controlled it to 0.015% or less. The lower the C content, from the viewpoint of corrosion resistance, the more the precipitation of Cr carbide particularly at a heat affected zone can be suppressed and the intergranular corrosion resistance can be enhanced, and, from the viewpoint of press formability, the more the total elongation and average r-value can be enhanced due to the decrease of solute C. When further excellent corrosion resistance and press formability are required, it is preferable to reduce the C content to 0.005% or lower.

N can particularly enhance the press formability of a steel sheet by controlling the content to 0.015% or less. The lower the N content, the more the total elongation and average r-value of the steel sheet can be enhanced due to the decrease of solute N.

Ti and Nb can enhance both corrosion resistance and press formability of a steel sheet by controlling the total content of one or both of Ti and Nb to eight times or more the total content of C and N. Ti and Nb combine with C and N easily, have a function to substantially lower C and N dissolved in steel, and, as a result, can enhance the total elongation, average r-value and resultant press formability of a steel sheet. It is possible to suppress the precipitation of Cr carbide particularly at a heat affected zone by combining C with Ti or Nb and enhance the intergranular corrosion resistance of a steel sheet. These effects are insufficient if the total content of Ti and Nb is less than eight times the total content of C and N.

Mo is effective in reducing the local corrosion on the outer surface of a fuel tank in a salt damage environment. FIG. 1 is a graph showing the relationship between the Mo content in a ferritic stainless steel sheet and the depth of crevice corrosion. Cold rolled and annealed steel sheets (0.8 mm thickness) containing, in mass, 0.0025% of C, 0.0085% of N, 17.0% of Cr, 0.15% of Ti and Mo were used as test materials. Two steel sheets were laid one over the other and subjected to spot welding. Using the test pieces thus prepared, a combined cycle corrosion test (artificial seawater spraying→drying→dampening, 90 cycles) simulating a salt damage environment at the exterior of a fuel tank was carried out. After the test, the spot welded portion was peeled off and the depth of crevice corrosion generated in the clearance between the two steel sheets formed by the spot welding was measured. As is clear from FIG. 1, Mo, at an addition of 0.5% or more, shows a remarkable effect in improving crevice corrosion resistance. However, the addition in excess of 2% saturates the improvement effect and deteriorates workability. For that reason, the addition amount of Mo is set at 0.5 to 2.0%.

Ni can improve corrosion resistance, crevice corrosion resistance in particular, of a steel sheet in a salt damage environment by controlling the content to 0.3% or more. However, if added in excess, the occurrence of stress corrosion cracking is concerned even for ferritic stainless steel and austenite may be formed partially. For this reason, the upper limit of the content is set at 1.5%.

Cu can, like Ni, improve corrosion resistance, crevice corrosion resistance in particular, of a steel sheet in a salt damage environment by the addition of 0.3% or more. However, if added in excess, hot workability and the productivity of the steel sheet deteriorate. For this reason, the upper limit of the content is set at 1.5%.

When B content is 0.0003% or more and 0.005% or less, the formability of a steel sheet after deep drawing forming is improved. This effect appears only when the content is 0.0003% or more. On the other hand, if contained abundantly in excess of 0.005%, elongation deteriorates. For this reason, the upper limit of the content has to be 0.005%.

When Mg content is 0.0005% or more and 0.005% or less, the average r-value of a steel sheet further improves and deep drawability is further enhanced. This effect appears only when the content is 0.0005% or more. On the other hand, if contained abundantly in excess of 0.005%, the corrosion resistance of a steel sheet deteriorates. For this reason, the upper limit of the content has to be 0.005%.

The lower the Si content, the higher the total elongation of a steel sheet, and thus excellent press formability can be obtained. This effect markedly appears when the content is lowered to 0.14% or less.

The lower the Mn content, the higher the total elongation of a steel sheet, and thus excellent press formability can be obtained. This effect markedly appears when the content is lowered to 0.20% or less.

The content of P is not particularly specified in the present invention. P is an element which inevitably intermixes. The lower the content, the better the corrosion resistance and press formability, but a content of 0.05% or less is tolerable.

S is an unavoidable impurity and the smaller, the better. If S content is equal to or more than C content, namely S≧C, the total elongation of a steel sheet increases and thus press formability is further enhanced. However, if S is contained in excess, corrosion resistance unfavorably deteriorates. The upper limit is about 0.01%.

Note that if hot dip Al, Sn and/or Zn plating is applied on the surfaces of a ferritic stainless steel sheet according to the present invention, corrosion resistance, particularly in a salt damage environment, can further be enhanced.

A fuel tank made of a ferritic stainless steel sheet according to the present invention is produced through the following processes. Steel having the aforementioned chemical composition is refined and produced in a steelmaking furnace such as a converter, an electric arc furnace, etc., and processed into slabs by the continuous casting method, or into ingots and then into slabs by a breakdown mill. These slabs are heated and hot rolled into hot rolled steel strips. These hot rolled steel strips are annealed, when necessary, and subjected to cold rolling and annealing processes to produce ferritic stainless steel sheets. More specifically, the annealing of the hot rolled steel strips is conducted at a temperature from 900 to 1,150° C. In the cold rolling, the total reduction is set at 70% or more. When required, another annealing is implemented at a temperature from 800 to 1,150° C. during the cold rolling. The finish annealing is performed at a temperature from 900 to 1,150° C. After that, for the smooth press forming of the steel sheets to fabricate fuel tanks, a resin such as epoxy, urethane, etc. mixed with wax is coated on the surfaces of the steel sheets, lubricant films are formed, and the surface friction coefficient of the steel sheets is adjusted to 0.10 or lower. The steel sheet having the lubricant films thus formed are processed into the fuel tank parts of the prescribed shapes with a press and then the fabricated parts are assembled into fuel tanks by combining them with spot welding and the like.

EXAMPLE

Example 1

The steel sheets (0.8 mm thickness) having the average r-values, Δr, total elongation and textures shown in Table 2 were produced using steel whose components are shown in Table 1 and varying the conditions of hot strip annealing, cold rolling and annealing as explained above. Then, lubricant films comprising epoxy or urethane mixed with wax were coated, and the surface friction coefficient was varied by varying the thickness and/or the composition of the lubricant films. Here, though comparative example 5 was made of SUS304L which was austenitic stainless steel and not ferritic stainless steel, it was shown for comparison of press formability. The fuel tanks fabricated by press forming using these steel sheets were box shaped fuel tanks X (forming height of about 100 mm), box shaped fuel tanks Y (forming height of about 260 mm) and saddle shaped fuel tanks Z (forming height of about 150 mm), and the severity of working conditions increased in the order of the fuel tanks X, the fuel tanks Y and the fuel tanks Z.

TABLE 1

| Steel | Chemical composition (mass %) | | | | | | | | | | | | | | |
|---|---|---|---|---|---|---|---|---|---|---|---|---|---|---|---|
| | C | N | Si | Mn | P | S | Ni | Cr | Mo | Cu | Ti | Nb | Al | B | Mg |
| A | 0.0037 | 0.012 | 0.09 | 0.14 | 0.021 | 0.0010 | — | 17.3 | 1.13 | — | 0.23 | — | 0.081 | — | — |
| B | 0.0013 | 0.006 | 0.11 | 0.10 | 0.017 | 0.0059 | — | 17.0 | 1.21 | — | 0.10 | — | 0.004 | — | — |
| C | 0.0039 | 0.010 | 0.08 | 0.14 | 0.024 | 0.0013 | — | 17.3 | 1.21 | — | 0.21 | — | 0.073 | 0.0007 | — |
| D | 0.0030 | 0.011 | 0.08 | 0.10 | 0.013 | 0.0018 | — | 17.5 | 1.10 | — | 0.15 | — | 0.013 | — | 0.0025 |
| E | 0.0035 | 0.012 | 0.08 | 0.12 | 0.024 | 0.0008 | — | 17.4 | 0.52 | — | 0.22 | — | 0.082 | — | — |
| F | 0.0042 | 0.014 | 0.17 | 0.14 | 0.023 | 0.0016 | 0.10 | 19.2 | 1.87 | — | 0.14 | 0.26 | 0.055 | — | — |
| G | 0.0058 | 0.012 | 0.36 | 0.96 | 0.029 | 0.0014 | 0.10 | 18.3 | 1.57 | — | 0.13 | 0.51 | 0.015 | 0.0008 | — |
| H | 0.0140 | 0.014 | 0.48 | 0.11 | 0.023 | 0.0030 | 0.30 | 19.2 | — | 0.43 | — | 0.40 | 0.015 | — | — |
| I | 0.0140 | 0.014 | 0.47 | 0.12 | 0.023 | 0.0030 | 0.33 | 19.2 | 0.53 | 0.40 | — | 0.40 | 0.015 | — | — |
| J | 0.0080 | 0.013 | 0.47 | 0.35 | 0.019 | 0.0040 | — | 11.2 | — | — | 0.23 | — | 0.052 | — | — |
| K | 0.0061 | 0.011 | 0.10 | 0.13 | 0.026 | 0.0015 | 0.12 | 22.3 | 1.63 | — | 0.18 | 0.30 | 0.053 | — | — |

TABLE 2

Material property, lubrication property and press test result

| | Steel | Average r-value | Δr | Total elongation (%) | I(111)/I(100) | Lubrication | Friction coefficient of lubricant film | Press test result | | |
|---|---|---|---|---|---|---|---|---|---|---|
| | | | | | | | | Tank X 100 mm | Tank Y 250 mm | Tank Z Saddle shape 150 mm |
| Present invention 1 | A | 2.29 | 0.70 | 35.1 | 32 | Lubricant film | 0.050 | ○ | ○ | ○ |
| Present invention 2 | A | 1.91 | 0.71 | 34.3 | 17 | Lubricant film | 0.052 | ○ | ○ | ○ |
| Present invention 3 | A | 1.91 | 0.71 | 34.3 | 17 | Lubricating oil | — | ○ | ○ | ○ |
| Present invention 4 | B | 2.61 | 0.81 | 36.2 | 35 | Lubricant film | 0.082 | ○ | ○ | ○ |
| Present invention 5 | C | 2.01 | 0.14 | 33.3 | 16 | Lubricant film | 0.031 | ○ | ○ | ○ |
| Present invention 6 | D | 2.25 | 0.70 | 34.8 | 25 | Lubricant film | 0.038 | ○ | ○ | ○ |

TABLE 2-continued

Material property, lubrication property and press test result

| | Steel | Average r-value | Δr | Total elongation (%) | I(111)/ I(100) | Lubrication | Friction coefficient of lubricant film | Press test result | | |
|---|---|---|---|---|---|---|---|---|---|---|
| | | | | | | | | Tank X 100 mm | Tank Y 250 mm | Tank Z Saddle shape 150 mm |
| Present invention 7 | E | 1.91 | 0.83 | 35.6 | 15 | Lubricant film | 0.048 | ○ | ○ | ○ |
| Present invention 8 | F | 2.20 | 0.81 | 31.6 | 23 | Lubricant film | 0.051 | ○ | ○ | ○ |
| Present invention 9 | G | 1.90 | 0.62 | 30.0 | 12 | Lubricant film | 0.035 | ○ | ○ | ○ |
| Present invention 10 | H | 2.09 | 0.98 | 30.9 | 19 | Lubricant film | 0.031 | ○ | ○ | ○ |
| Present invention 11 | I | 1.99 | 0.86 | 30.0 | 18 | Lubricant film | 0.035 | ○ | ○ | ○ |
| Present invention 12 | J | 2.10 | 0.32 | 39.8 | 17 | Lubricant film | 0.052 | ○ | ○ | ○ |
| Present invention 13 | K | 1.90 | 0.88 | 30.1 | 11 | Lubricant film | 0.032 | ○ | ○ | ○ |
| Comparative example 1 | A | 1.53 | 0.64 | 33.4 | 8 | Lubricant film | 0.050 | X | X | X |
| Comparative example 2 | A | 2.30 | 1.51 | 34.2 | 25 | Lubricant film | 0.050 | ○ | X | X |
| Comparative example 3 | A | 1.92 | 0.66 | 28.9 | 18 | Lubricant film | 0.050 | ○ | X | X |
| Comparative example 4 | A | 1.91 | 0.71 | 34.3 | 17 | Lubricant film | 0.150 | ○ | ○ | X |
| Comparative example 5 | SUS304 | 1.07 | 0.19 | 50.5 | — | Lubricating oil | — | ○ | ○ | ○ |

*[1]○: Formable, X: Not formable

As is shown in Table 2, when the conditions specified in the present invention are satisfied, even ferritic stainless steel shows no cracking and is formable even under the severe press working to form fuel tanks, like austenitic stainless steel of the comparative example 5. In contrast, since the average r-value in comparative example 1, Δr in comparative example 2, the total elongation in comparative example 3 and the friction coefficient in comparative example 4 deviate from the ranges specified in the present invention respectively, cracking occurs during the press forming of fuel tanks.

INDUSTRIAL APPLICABILITY

A fuel tank made of a ferritic stainless steel sheet according to the present invention has excellent corrosion resistance in the outer and inner environments of the fuel tank, excellent formability in forming the fuel tank, and no cracking generation during forming, and therefore a fuel tank free from stress corrosion cracking can be provided.

What is claimed is:

1. A fuel tank characterized by being made of a ferritic stainless steel sheet containing 10 to 25 mass % of Cr and having an average r-value of 1.9 or larger, an r-value in-plane anisotropy Δr of 1.0 or smaller, and a total elongation of 30% or larger,
   said fuel tank being fabricated from the ferritic stainless steel sheet having on surfaces thereof a lubricant film providing a surface friction coefficient of 0.10 or less.

2. A fuel tank according to claim 1, characterized by being made of a ferritic stainless steel sheet having a plane intensity ratio of I(111)/I(100) of 10 or larger.

3. A fuel tank characterized by being made of a ferritic stainless steel sheet: comprising, in mass,
   10 to 25% of Cr,
   0.015% or less of C,
   0.015% or less of N, and
   one or more of Ti and Nb in a manner to satisfy the expression (Ti+Nb)/(C+N)≧8, with the balance consisting of Fe and unavoidable impurities; and having an average r-value of 1.9 or larger, an r-value in-plane anisotropy Δr of 1.0 or smaller, and a total elongation of 30% or larger,
   said fuel tank being fabricated from the ferritic stainless steel sheet having on surfaces thereof a lubricant film providing a surface friction coefficient of 0.10 or less.

4. A fuel tank according to claim 3, characterized by being made of a ferritic stainless steel sheet having a plane intensity ratio I(111)/I(100) of 10 or larger.

5. A fuel tank according to claim 3, characterized by being made of a ferritic stainless steel sheet containing 0.005 mass % or less of C.

6. A fuel tank according to claim 3, characterized by being made of a ferritic stainless steel sheet containing 0.14 mass % or less of Si.

7. A fuel tank according to claim 3, characterized by being made of a ferritic stainless steel sheet containing 0.20 mass % or less of Mn.

8. A fuel tank according to claim 3, characterized by being made of a ferritic stainless steel sheet containing, in mass %, S and C in a manner to satisfy the expression S≧C.

9. A fuel tank according to claim 3, characterized by being made of a ferritic stainless steel sheet further containing one or more of Mo, Cu, Ni, B and Mg, in mass, in the range of
   0.5 to 2.0% for Mo,
   0.3 to 1.5% for Cu,
   0.3 to 1.5% for Ni,
   0.0003 to 0.005% for B, and
   0.0005 to 0.005% for Mg.

10. A ferritic stainless steel sheet for a fuel tank characterized by containing 10 to 25 mass % of Cr and having an average r-value of 1.9 or larger, an r-value in-plane anisotropy Δr of 1.0 or smaller, and a total elongation of 30% or larger, said ferritic stainless steel sheet having on surfaces thereof a lubricant film providing a surface friction coefficient of 0.10 or less.

11. A ferritic stainless steel sheet according to claim 10, characterized by having a plane intensity ratio I(111)/I(100) of 10 or larger.

12. A ferritic stainless steel sheet for a fuel tank characterized by comprising, in mass, 10 to 25% of Cr, 0.015% or less of C, 0.015% or less of N, and one or more of Ti and Nb in a manner to satisfy the expression (Ti+Nb)/(C+N)≧8, with the balance consisting of Fe and unavoidable impurities; and having an average r-value of 1.9 or larger, an r-value in-plane anisotropy Δr of 1.0 or smaller, and a total elongation of 30% or larger, said ferritic stainless steel sheet having on surfaces thereof a lubricant film providing a surface friction coefficient of 0.10 or less.

13. A ferritic stainless steel sheet according to claim 12, characterized by having a plane intensity ratio I(111)/I(100) of 10 or larger.

14. A ferritic stainless steel sheet according to claim 12, characterized by containing 0.005 mass % or less of C.

15. A ferritic stainless steel sheet according to claim 12, characterized by containing 0.14 mass % or less of Si.

16. A ferritic stainless steel sheet according to claim 12, characterized by containing 0.20 mass % or less of Mn.

17. A ferritic stainless steel sheet according to claim 12, characterized by containing, in mass %, S and C in a manner to satisfy the expression S≧C.

18. A ferritic stainless steel sheet according to claim 12, characterized by further containing one or more Mo, Cu, Ni, B and Mg, in mass, in the range of:

0.5 to 2.0% for Mo, 0.3 to 1.5% for Cu, 0.3 to 1.5% for Ni, 0.0003 to 0.005% for B, and 0.0005 to 0.005% for Mg.

* * * * *

UNITED STATES PATENT AND TRADEMARK OFFICE
CERTIFICATE OF CORRECTION

| | |
|---|---|
| PATENT NO. | : 6,645,318 B2 |
| APPLICATION NO. | : 09/922668 |
| DATED | : November 11, 2003 |
| INVENTOR(S) | : Akihiko Takahashi et al. |

It is certified that error appears in the above-identified patent and that said Letters Patent is hereby corrected as shown below:

Column 7, line 7, change "hot dip Al, Sn, and/or Zn plating" to -- hot dip Al, Pb and/or Zn plating --;

Signed and Sealed this
Third Day of January, 2012

David J. Kappos
*Director of the United States Patent and Trademark Office*